US006581941B2

(12) United States Patent  (10) Patent No.: US 6,581,941 B2
Carr  (45) Date of Patent: Jun. 24, 2003

(54) GASKET HAVING CENTERING FEATURES (76) Inventor: Ronald L. Carr, 1807 Baker Way Loop, #100, Kelso, WA (US) 98626

( * ) Notice: Subject to any disclaimer, the term of this patent is extended or adjusted under 35 U.S.C. 154(b) by 0 days.

(21) Appl. No.: 09/905,594

(22) Filed: Jul. 13, 2001

(65) Prior Publication Data

US 2001/0040349 A1 Nov. 15, 2001

Related U.S. Application Data (63) Continuation of application No. 09/104,126, filed on Jun. 23, 1998, now Pat. No. 6,260,853.

(51) Int. Cl.⁷ .................................. F16L 17/06
(52) U.S. Cl. ................. 277/609; 277/608; 277/616; 285/23
(58) Field of Search ................. 277/314, 598, 277/603, 608, 609, 611, 612, 614, 615, 616, 617, 619, 625, 627, 630, 637, FOR 219; 285/23, 368, 379, 380

(56) References Cited

U.S. PATENT DOCUMENTS

| | | | | |
|---|---|---|---|---|
| 811,000 A | * | 1/1906 | Tompkins | .................... 277/609 |
| 2,462,762 A | * | 2/1949 | Nardin | ........................ 277/609 |
| 2,532,891 A | | 12/1950 | Chupp | |
| 2,616,946 A | | 11/1952 | Scheer | |
| 3,141,686 A | | 7/1964 | Smith et al. | |
| 3,214,201 A | | 10/1965 | Fonda | |
| 3,278,883 A | | 10/1966 | Lipsey | |
| 3,387,867 A | | 6/1968 | Rogers | |
| 3,398,978 A | | 8/1968 | Gasche | |
| 4,094,520 A | * | 6/1978 | Ng et al. | .................... 277/609 |
| 4,516,784 A | | 5/1985 | Merz | |
| 4,569,540 A | | 2/1986 | Beson | |
| 4,848,730 A | | 7/1989 | Logman et al. | |
| 5,071,140 A | | 12/1991 | Quevedo del Rio | |
| 5,203,576 A | * | 4/1993 | Miyaoh et al. | |
| 5,409,270 A | * | 4/1995 | Shinohara et al. | ...... 277/609 X |
| 5,461,904 A | | 10/1995 | Baker | |
| 5,472,214 A | | 12/1995 | Wainer et al. | |
| 5,482,332 A | * | 1/1996 | Ohmi et al. | ............. 285/379 X |
| 5,524,906 A | * | 6/1996 | Rackov et al. | ............... 277/609 |
| 5,716,051 A | * | 2/1998 | Cornea et al. | .......... 277/616 X |
| 5,749,586 A | * | 5/1998 | Abe et al. | .................... 277/608 |
| 6,367,803 B1 | * | 4/2002 | Loth | ....................... 277/616 X |

FOREIGN PATENT DOCUMENTS

| | | |
|---|---|---|
| DE | 2851566 | 11/1978 |
| FR | 342721 | 4/1904 |
| GB | 923015 | 4/1963 |

* cited by examiner

Primary Examiner—Anthony Knight
Assistant Examiner—E Peavey
(74) Attorney, Agent, or Firm—Birdwell, Janke & Durando, PLC (57) ABSTRACT A gasket having centering features. The gasket comprises a centering portion for which three embodiments are described. The centering portion is switchable between a flush configuration, in which the gasket may be employed between the flange faces of two pipe flanges as typical, and a centering configuration, in which the gasket provides a means for centering the gasket in the pipe joint. In a first embodiment, a normally flush centering portion comprises a flap for centering the gasket, in a second embodiment, the centering portion comprises a collapsible protuberance for centering the gasket, in a third embodiment, the gasket comprises a non-collapsible protuberance for centering the gasket which is physically removable, and in a fourth embodiment the centering portion comprises an annular ring adapted for mating with an annular relief formed in a corresponding one of the flange faces.

28 Claims, 9 Drawing Sheets

GASKET HAVING CENTERING FEATURES

This is a continuation of Ser. No. 09/104,126, filed Jun. 23, 1998, now U.S. Pat. No. 6,260,853 incorporated by reference here in its entirety.

BACKGROUND OF THE INVENTION

This invention relates to gaskets for the joinder of pipes, particularly to features provided in such a gasket for centering the gasket in a flanged pipe joint.

It is well known to be desirable, in fluid piping systems, to provide a smooth fluid path. Non-smooth surfaces increase flow resistance and trap fluid and particulate matter which would otherwise be easily flushed out of the system. This is particularly important when carrying ultra-pure materials. Protrusions and recesses alike trap bacteria or contaminants which may be released unexpectedly and undesirably at later times. In ultra-pure piping systems, contaminants in the parts per billion range may be unacceptable. Such low levels of contamination generally require extremely small surface irregularities in pipe. Concern for this can be so great that, for example, the piping pore size may be regularly inspected using scanning electron microscopy and the pipe joint rejected if the pore size is greater than a maximum allowable value. On account of the fitting together of two different sections of pipe, however, the pipe joint makes an important contribution to the problem of contaminant trapping. Moreover, the quality of this fitting cannot easily be inspected.

In particular, sections of pipe are joined with gaskets. This is because pipe flanges are formed of relatively rigid materials so that they may carry tightening forces. Pipe flange surfaces are not completely smooth or flat, and pipes are not perfectly aligned. Therefore, pipe flanges may not generally be joined in a leak-proof manner without the aid of the relatively compliant, mediating gasket. Within limits, the gasket conforms to the surface quality and angular presentation of the flange surfaces to accommodate any mis-match therebetween, to seal them.

The gasket ideally has an aperture conforming to the inner periphery of the pipe flanges, and extends radially outwardly along the interior surfaces of the pipe flanges. Typical prior art gaskets include holes through which bolts for tightening the joint are passed. The holes are larger than the bolts to ease their installation. However, the holes also provide for locating the gasket with respect to the inner periphery of the pipe flanges. It is not possible, therefore, to position the aperture to be precisely congruent with the inner periphery of the flanges.

The aperture is, typically, made "on-size", i.e., so that the diameter of the aperture is about equal to the diameter of the inner periphery of the flanges. Since registration of the aperture with the inner periphery of the flanges is not perfect, however, the gasket generally protrudes into the stream of fluid flow in some places, and recesses from the inner surfaces of the pipe flanges in other places. Moreover, such traps cannot be avoided by making the gasket over or under-sized.

Accordingly, there is a need for a gasket having centering features that provide for improved centering the gasket in a flanged pipe joint, to decrease flow resistance and the propensity to trap fluid and particulate matter.

SUMMARY OF THE INVENTION

The present invention solves the aforementioned problems and meets the aforementioned need by providing, for use in a pipe joint comprising two pipe flanges, each pipe flange being defined by an outer diameter and an inner diameter, and including respective flange faces, outer peripheral surfaces, and inner peripheral surfaces for conducting fluid through the joint, a gasket having centering features adapted for placement of the gasket between the flange faces.

The gasket includes one or more centering portions for centering the gasket radially between the faces of the pipe flange. The centering portions are generally switchable between two configurations: a flush configuration and a centering configuration. The flush configuration permits selecting centering portions for non-use where such centering portions correspond to a size of pipe flange for which the gasket is not being employed.

The centering portions include associated centering edges adapted for making contact with the outer peripheral surface of a selected one of the flanges. The gasket is moved radially between the flange faces until the centering edge of the centering portion abuts the outer peripheral surface. The centering portion is pre-positioned for a given outer diameter of the pipe flange for centering the gasket along an associated radial line.

In a first embodiment of the invention, the centering portion includes a flap element which normally lies flush with the gasket. The flap element can be pressed out of the plane of the gasket to ready the associated centering edge for contact with the pipe flange. In a second embodiment of the invention, the centering portion includes a protuberance which extends from one side of the gasket. The protuberance contains an associated centering edge on a side thereof. The centering portion also includes a cavity in the other side of the gasket which is associated with the protuberance so that pressing the protuberance into the plane of the gasket and into the cavity places the centering portion in its flush configuration, wherein the protuberance becomes substantially flush with the gasket. In a third embodiment of the invention, the centering portion includes a protuberance which extends from one or both sides of the gasket. Removing the protuberance from the gasket places the centering portion in its flush configuration. In a fourth embodiment of the invention, the centering portion comprises an annular ring adapted for mating with an annular relief formed in a corresponding one of the flange faces.

Accordingly, it is a principal object of the present invention to provide a novel gasket having centering features.

It is another object of the present invention to provide such a gasket that decreases flow resistance and the propensity to trap fluid and particulate matter.

It is still another object of the present invention to provide such a gasket that provides for improved centering of a gasket in a flanged pipe joint.

It is yet another object of the present invention to provide such a gasket that provides for adjustment to accommodate different sizes of pipe flanges.

The foregoing and other objects, features and advantages of the invention will be more readily understood upon consideration of the following detailed description of the invention, taken in conjunction with the following drawings.

DETAILED DESCRIPTION OF A PREFERRED EMBODIMENT

Figure 1:
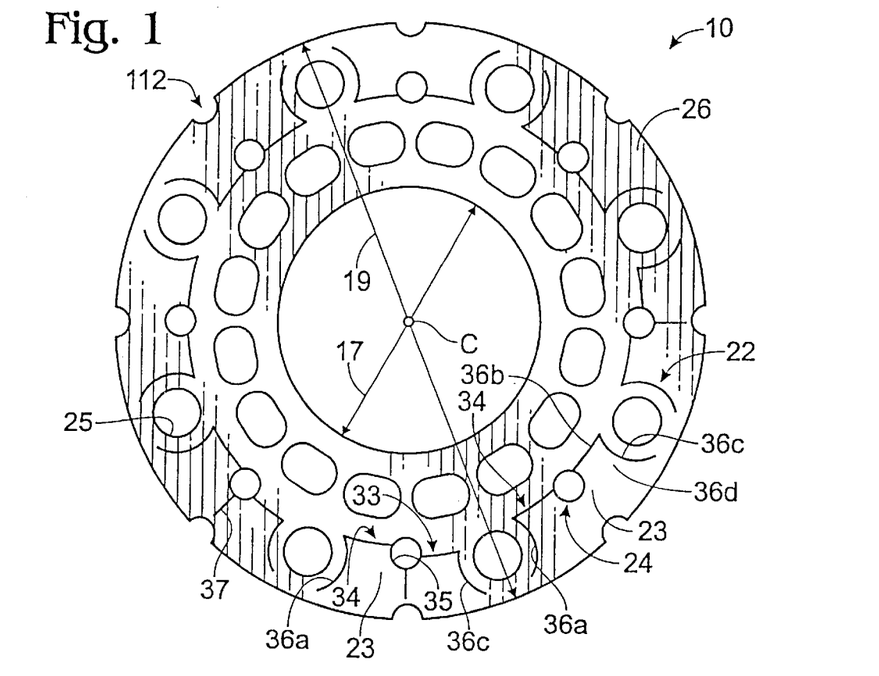
FIG. 1 is a plan view of a first embodiment of a gasket having centering features according to the present invention.

A gasket having centering features 10 according to the present invention is particularly adapted for use with plastic pipe systems; however, the present invention may be employed to advantage as well in metal or ceramic piping systems. One example of the gasket 10 is shown in FIG. 1. The gasket 10 has an inner diameter 17 and an outer diameter 19 with respect to a center-point "C". The dimensions of the diameters 17 and 19 are determined in consideration of the sizes of pipes and pipe flanges which are to be joined.

Figure 2A:
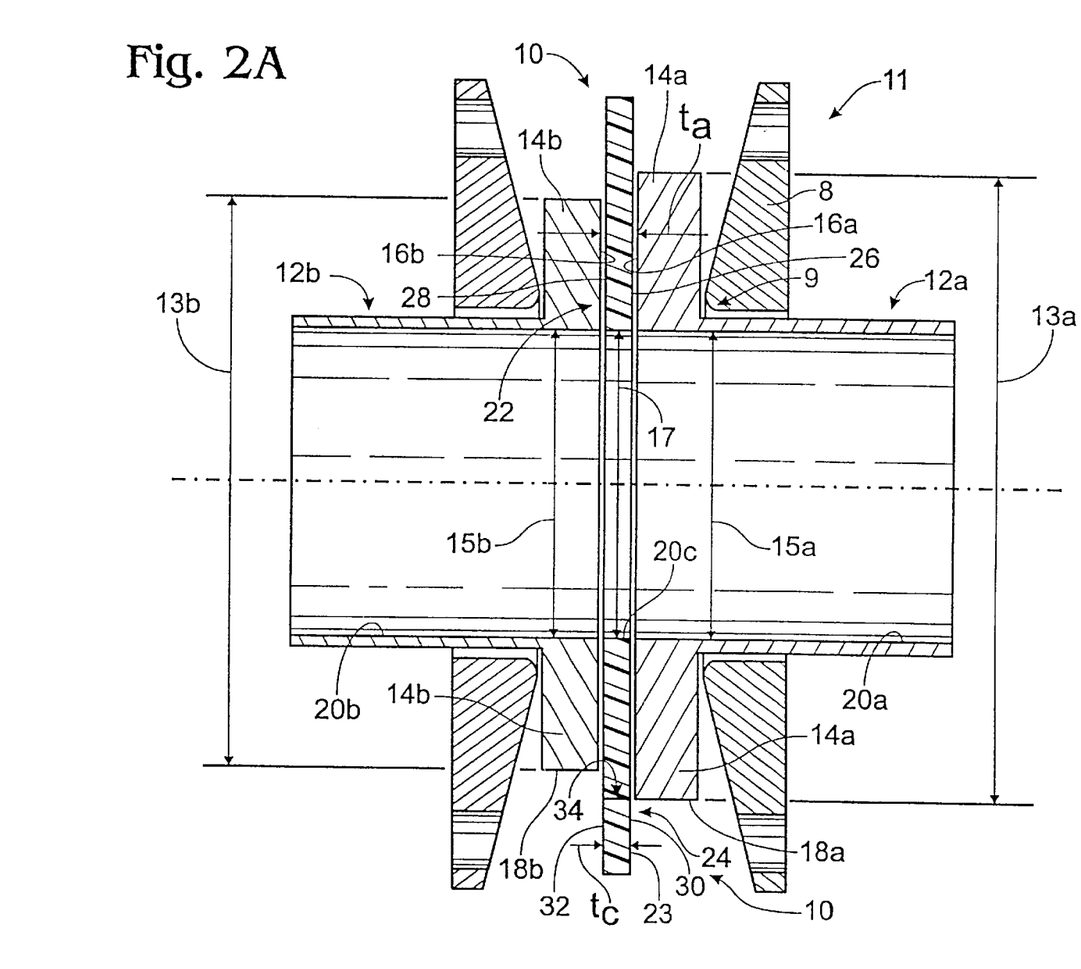
FIG. 2A is a cross-section of a pipe joint employing the gasket of FIG. 1 with a centering portion according to the present invention in a flush configuration.

Referring to FIG. 2A, a typical pipe joint 11 is shown in cross-section. The joint includes pipe sections 12a, 12b, and flanges 14a, 14b. The typically cylindrical flanges 14a, 14b are defined by outer diameters 13a, 13b and inner diameters 15a, 15b. The flanges include respective flange faces 16a, 16b, outer peripheral surfaces 18a, 18b and inner peripheral surfaces 20a, 20b for conducting fluid through the joint 11. It is an outstanding feature of the present invention to accommodate any combination of dimensions of the pipe sections and flanges.

The gasket is adapted for placement between the flange faces 16a, 16b. The gasket includes an annular region 22 having sides 26 and 28 that make contact with the flange faces. As a result, an inner peripheral surface 20c of the gasket is placed between the inner peripheral surfaces 20a and 20b of the flanges. Therefore, it is preferable that the inner diameter 15a of the flange 14a is substantially equal to the inner diameter 15b of the flange 14b and the inner diameter 17 of the gasket. This permits a diametric continuity to be maintained across the pipe joint 11 for minimizing flow restriction and trapping, to the extent that the gasket is centered in the joint. Notwithstanding, it is an outstanding feature of the present invention to accommodate pipe flanges having any combination of sizes of inner and outer diameters, the Figures reflecting particular combinations for illustrative purposes only.

The flanges 14a, 14b may be joined in the typical manner, with bolts passing through apertures in the flanges, or may be joined with bolts passing through a backing ring and directing mechanism, such as the backing mechanism 8 and directing mechanism 9, for directing and focusing the tightening load toward the inner periphery of the joint surface of the flange, which also decreases the propensity for trapping fluids and particulates, as taught in the inventor's U.S. patent application Ser. No. 08/344,881, incorporated by reference herein in its entirety.

Figure 3:
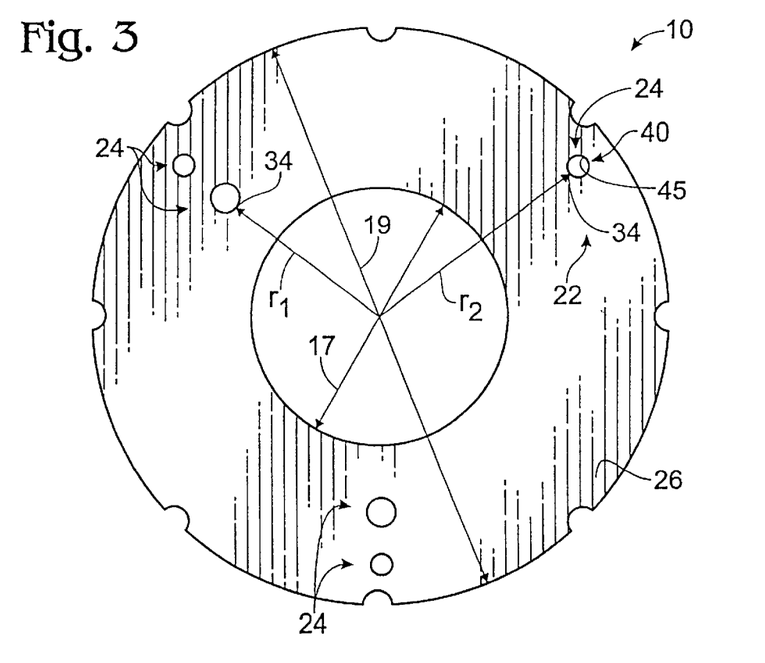
FIG. 3 is a plan view of a second embodiment of a gasket having centering features according to the present invention.
Figure 5:
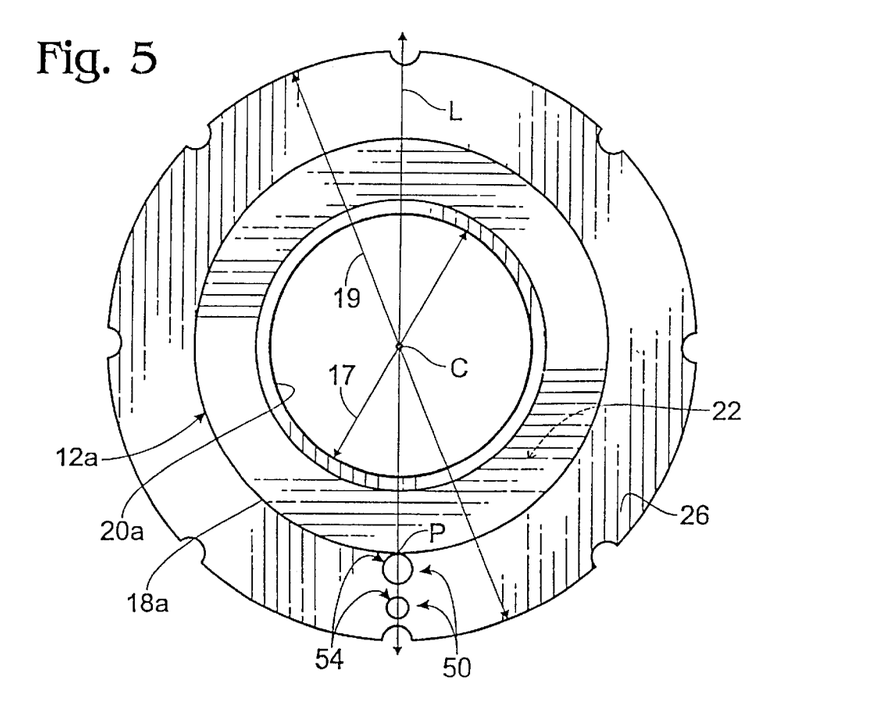
FIG. 5 is a plan view of a third embodiment of a gasket having centering features according to the present invention.

The gasket generally includes one or more centering portions 24 for centering the gasket transversely between the faces 16a, 16b. The centering portions are provided in the annular region 22 of the gasket. Preferably, a plurality of centering portions are provided at distinct, predetermined radial distances on the gasket, such as "$r_1$" and "$r_2$" as shown in FIGS. 3 and 5, for centering an associated plurality of different sized pipe flanges. Also preferably, there are at least three centering portions at any particular radial distance, such as "$r_1$", corresponding to a particular size of pipe flange outer diameter. This permits centering the gasket in all radial directions. The centering portions may be included on either or both sides 26, 28 of the gasket.

The centering portions are generally switchable between two configurations; a flush configuration and a centering configuration. The flush configuration permits selecting particular centering portions for non-use where such centering portions correspond to a size of pipe flange for which the gasket is not being employed.

Figure 2B:
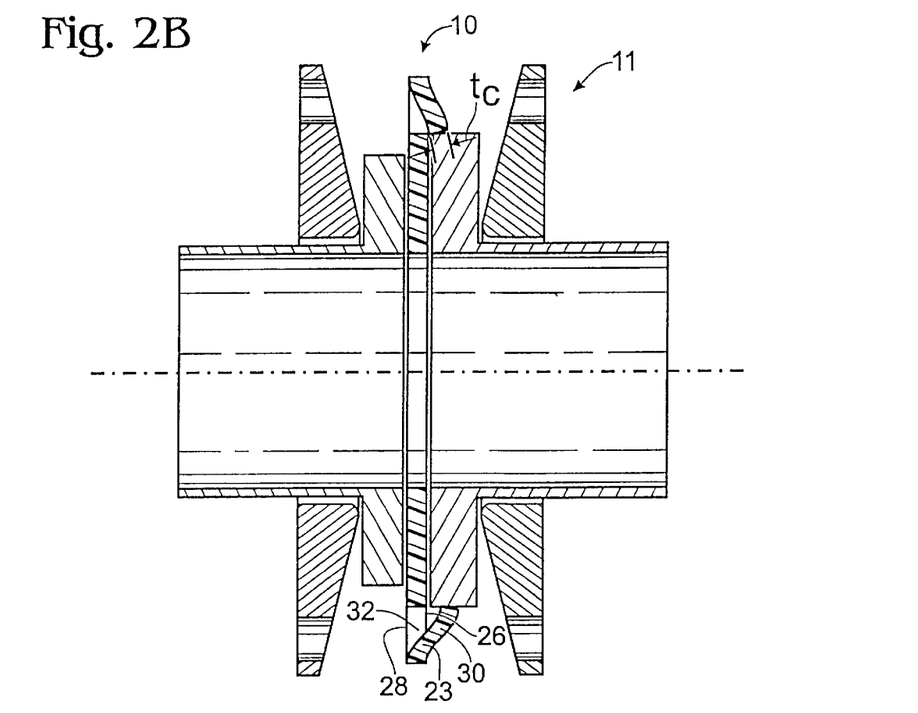
FIG. 2B is a cross-section of the pipe joint and gasket of FIG. 2A with the centering portion in a centering configuration.

Referring particularly to the embodiment of FIGS. 1, 2A and 2B, the centering portion 24 includes at least one flap element 23. The annular region 22 has a predetermined thickness $t_a$ defined by the distance between the sides 26 and 28, and the centering portion has a predetermined thickness "$t_c$" defined by the distance between a first side 30 and a second side 32 of the flap element 23. Preferably, the predetermined thickness of the centering portion is equal to or less than the predetermined thickness "$t_a$" of the annular region, so that a flush configuration of the flap element is optimally provided. Notwithstanding, it a thickness "$t_c$" that is greater than or less than the thickness of the annular region may be employed without departing from the principles of the invention.

The sides 30 and 32 of the flap element terminate at a centering edge 34. The centering edge is adapted to make contact with the outer periphery of a selected one of the pipe flanges. The edge 34 is shown in FIG. 1 as having a shape following a circle centered at "C"; however, it will be understood that the centering edge 34 of this and other embodiments of the invention may have shapes that differ from those described, may be of any length, and may comprise or consist of a single point of centering contact without departing from the principles of the invention.

The flap element 23 is hingedly connected to the annular region 22. Preferably, the flap element is formed out of the annular region by scoring three sides 36a, 36b and 36c thereof, wherein the side 36b forms the centering edge 34, leaving the flap element connected to the annular region by a natural hinge 36d. The centering portion is thereby normally in a flush configuration in which the centering portion lies flush with the annular region.

The flap element 23 may employ sides 36a, 36c that differ in length, to leave a centering edge 33 in addition to the centering edge 34 in the same flap element 23, for accommodating with the same flap element larger diameter pipe flanges than can be accommodated with the edge 34. The flap element is for this purpose relieved by a relief aperture 35 and slit 37 which permits bending the edge 34 with respect to the edge 33. For example, the edge 34 may be bent out of the way of a larger pipe flange so that the gasket may be located with respect to the pipe flange with the edge 33 rather than with the edge 34. Alternatively, the edge 34 may be adapted to center on the flange 14a while the edge 33 is adapted to center on the flange 14b. In similar manner, any number of additional centering edges at different radial distances, and their associated relief apertures, may be provided as will be readily apparent.

The centering portion may be adjusted between the flush configuration, in which the centering portion does not protrude substantially beyond the first and second sides 26, 28 of the annular region 22, and a centering configuration, shown in FIG. 2B, in which the centering portion is pivoted away from the general plane of the gasket so that the centering edge 34 protrudes beyond a selected one of the first and second sides 26, 28 of the annular region.

As shown particularly in FIG. 1, the gasket 10 may include other features, such as notches 112 for receiving a thickness gauge as taught in the inventor's International Application, No. PCT/US94/08087, Publication No. WO/9602787, herein incorporated by reference in its entirety, and apertures 25 for receiving bolts wherein the outer diameter of the gasket is appropriately sized relative to the outer diameters of the flanges for this purpose. It should be noted in connection with the former that the aforedescribed relief aperture 35 also provides a recess for receiving a thickness gage.

Figure 4:
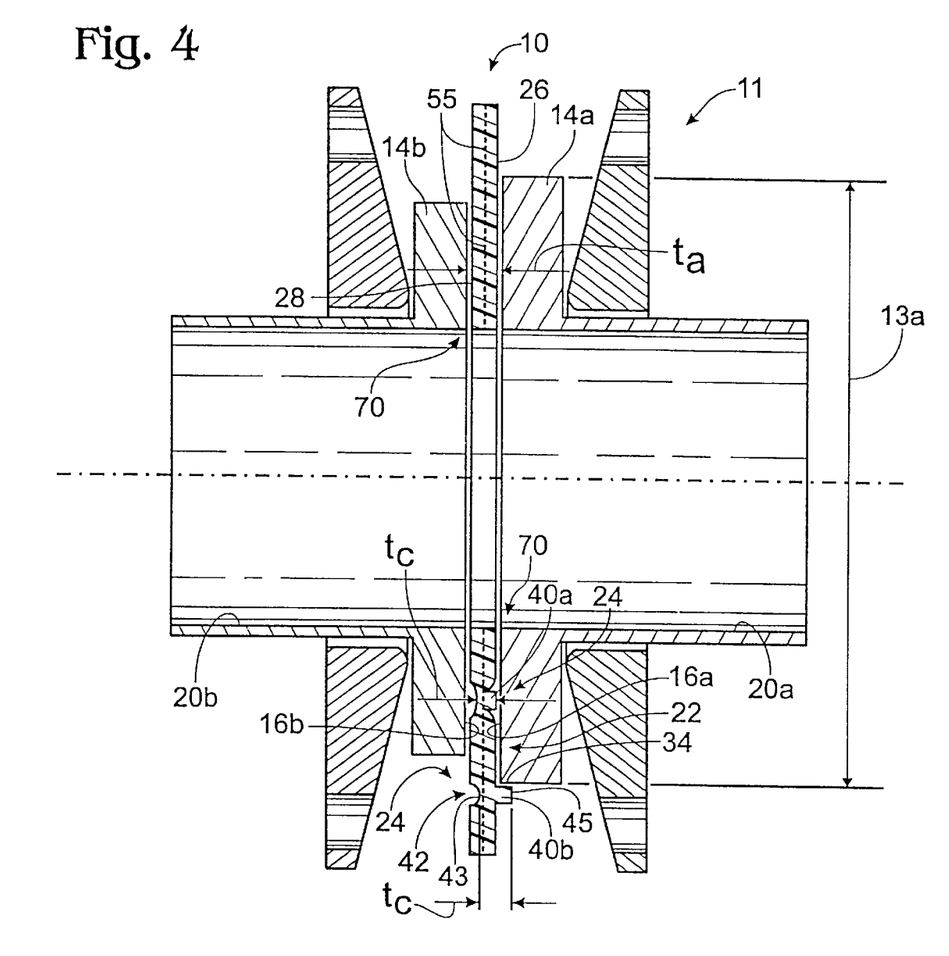
FIG. 4 is a cross-section of a pipe joint employing the gasket of FIG. 3 with a centering portion according to the present invention in a centering configuration and another such centering portion in a flush configuration.

Turning now to FIGS. 3 and 4, in a second embodiment of a gasket 10 according to the present invention, the centering portion 24 includes an axially extending, collapsible protuberance 40 and associated, preferably axially co-linear, cavity 42. The centering portion 24 has a predetermined thickness "$t_c$" defined by the bottom 43 of the cavity and the top 45 of the protuberance. Preferably, the predetermined thickness of the centering portion is equal to the predetermined thickness "$t_a$" of the annular region. The protuberance includes a centering edge 34 on a side thereof.

The centering portion 24 is normally in a centering configuration, in which the collapsible protuberance 40 protrudes axially from a selected one of the first and second sides of the annular region. The centering portion may be caused to adopt a flush configuration, in which the collapsible protuberance lies flush with the annular region 22 and does not protrude substantially beyond the first and second sides 26, 28 thereof. For example, the bulk of the collapsible protuberance 40 may be accommodated by the cavity 42 in response to pressing the collapsible protuberance toward the cavity. In FIG. 4, one protuberance 40a is shown in its flush configuration and another protuberance 40b is shown in its centering configuration.

Figure 6A:
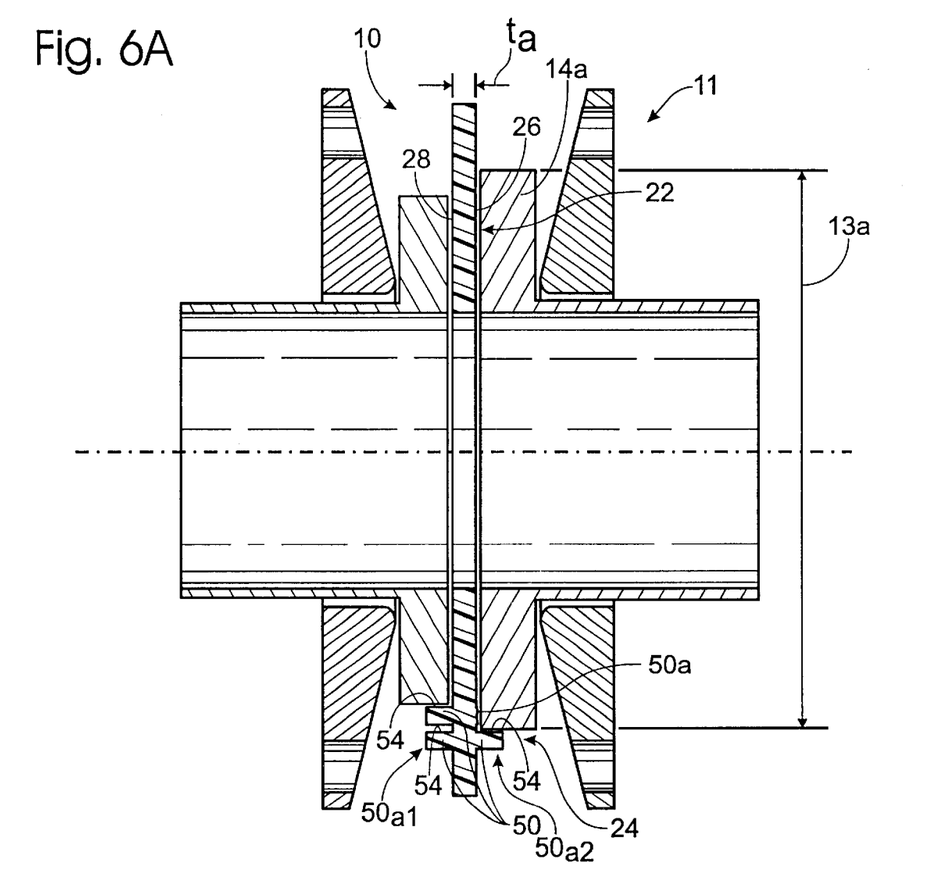
FIG. 6A is a cross-section of a pipe joint employing the gasket of FIG. 5 with a centering portion according to the present invention in a centering configuration and another such centering portion in a flush configuration.

Turning now to FIGS. 5 and 6A, in a third embodiment of the gasket, the centering portion includes a one or more axially extending removable protuberances 50 that extend axially outwardly from the sides 26, 28 of the annular region. Each of the removable protuberances 50 includes corresponding centering edges 54 on associated sides thereof.

Figure 6B:
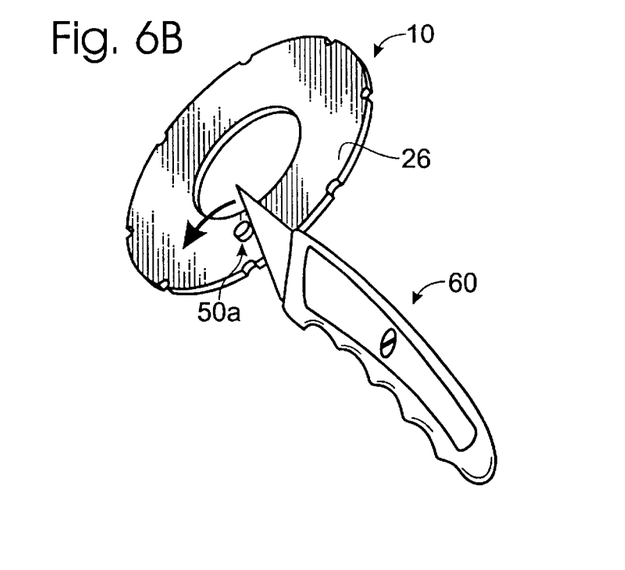
FIG. 6B is a pictorial view of a method for removing a centering portion of FIG. 6A.

The centering portion 24 is normally in a centering configuration, in which at least one of the removable protuberances 50 protrudes axially from a selected one or more of the first and second sides of the annular region. The centering portion may be caused to adopt a flush configuration in which one or more of the removable protuberances lie flush with the annular region 22 and do not protrude substantially beyond the first and second sides 26, 28 thereof, by physically removing the protuberance, such as by cutting the protuberance substantially flush with the associated side of the annular region. Referring to FIG. 6B, a knife 60 may be used for this purpose, as shown, whereas in FIG. 6A the remnant of a protuberance 50a that has been removed is indicated.

Figure 10:
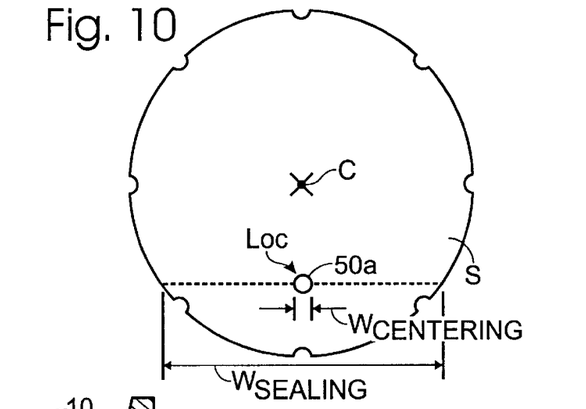
FIG. 10 is a plan view of the gasket of FIG. 6B with selected dimensions of the centering portion and the gasket.

Turning to FIG. 10, the centering portion 50 of the gasket 10 shown in FIG. 6B has a width "$w_{centering}$," and the side 26 has a corresponding width "$w_{sealing}$" at the centering portion 50. The width "$w_{sealing}$" is defined with respect to the location "Loc" at which the centering portion joins the sealing portion "S" of the gasket. Since the width "$w_{centering}$" is less (in the example shown, it is much less) than the width "$w_{sealing}$," the force or energy applied to the centering portion to separate the centering portion from the sealing portion can be less than that which would also corrupt the integrity of the sealing portion, e.g., by breaking or rupturing the sealing portion, which facilitates removal of the centering portion from the gasket.

To permit centering any of the aforedescribed embodiments of the gasket about a selected one of the pipe flanges 12a, 12b, e.g., the flange 12a, the outer diameter 19 of the gasket and the radial locations of the centering portion 24, such as "$r_1$" and "$r_2$" of FIG. 3, are pre-selected in consideration of the dimensions of the flange 14a. Specifically, the outer diameter 19 of the gasket is selected to be sufficiently larger than the outer diameter 13a of the pipe flange to permit the centering portion 24 to be disposed outside of the pipe flange. In cooperation, the centering edge is positioned to be substantially congruent with the outer peripheral surface 18a of the flange when the gasket is centered as desired.

For centering the aforedescribed embodiments of the gasket 10 in the pipe joint 11, the centering portion 24 is caused to adopt, if it is not already in, its centering configuration. With exemplary reference to FIG. 5, the centering edge 34 is thence permitted to contact the outer peripheral surface 18a of a selected flange 12a along one or more points of contact "P" contained thereon. This locates the gasket radially along lines "L" which intersect the points "P" and the center "C" of the flange.

With exemplary reference to FIG. 4, a stiffener 55 may be employed with any of the aforedescribed embodiments and, moreover, with any prior art gasket as well, such as the gasket described in the inventor's prior U.S. Pat. No. 5,362,115 (the '115 patent), herein incorporated by reference in its entirety. The stiffener is preferably a stainless steel wire mesh or grid which is encapsulated in a flexible, e.g., non-metallic, gasket material. The gasket material may be molded around an insert of the wire mesh, such processing being well known in the plastic molding arts. It is preferable to encapsulate the mesh in the vicinity of inner peripheral regions 70, which mediate the inner peripheral surfaces 20a, 20b and the flange faces 16a, 16b, to prevent the mesh, even though it is preferably formed of a relatively inert material, from potential damage and consequent spread of contamination due to its coming into contact with corrosive substances. Where the cavity 42 is employed, the mesh should also provide relief therefor. Otherwise, the bolt holes and other apertures through the gasket may be die-cut with the mesh in place. Notwithstanding, the mesh may be fully or partially encapsulated as desired without departing from the principles of the invention.

Figure 7A:
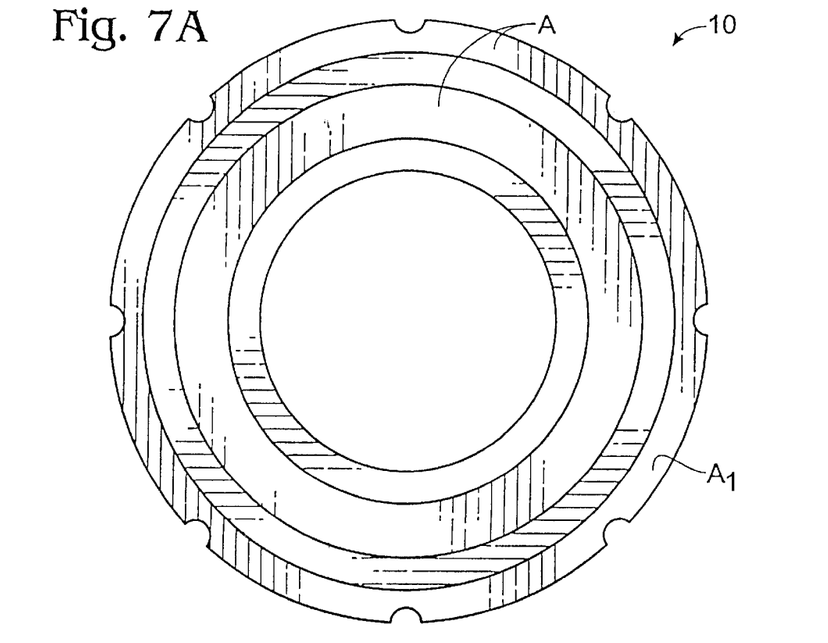
FIG. 7A is a generalized gasket showing areas of reduced thickness for use in a gasket having centering features according to the present invention.
Figure 7B:
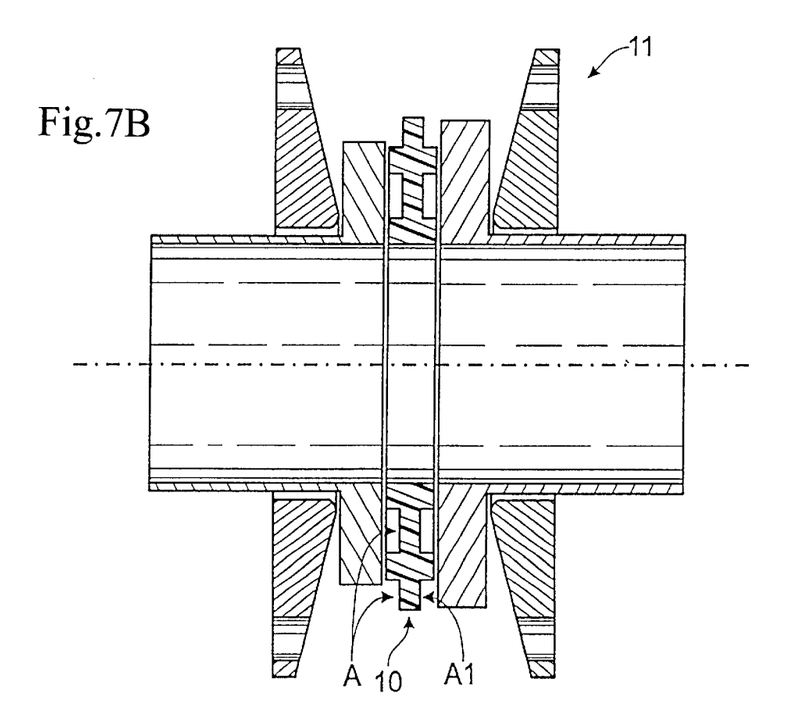
FIG. 7B is a cross-section of the gasket of FIG. 7A.
Figure 11:
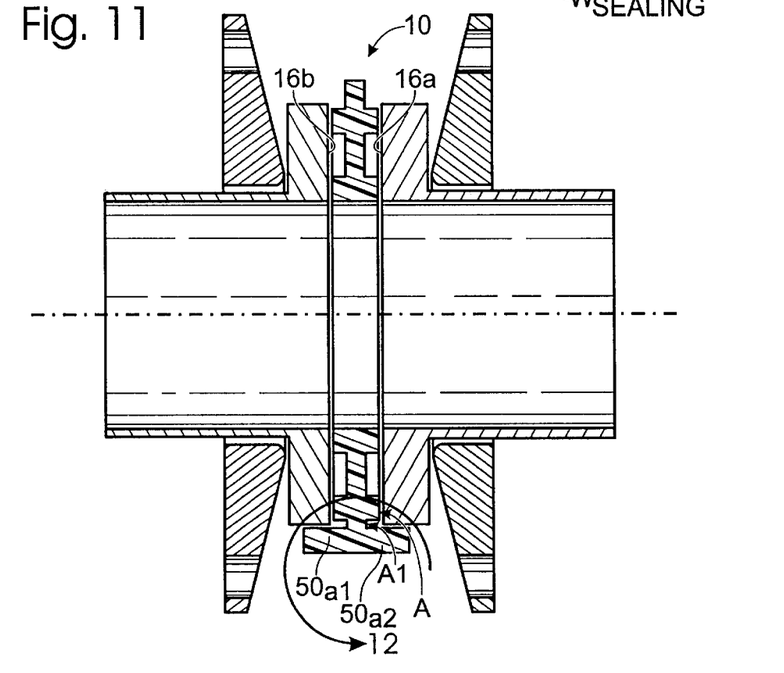
FIG. 11 is a cross-section of the pipe joint of FIG. 7B with centering portions according to the present invention in an annular area of reduced thickness.
Figure 12:
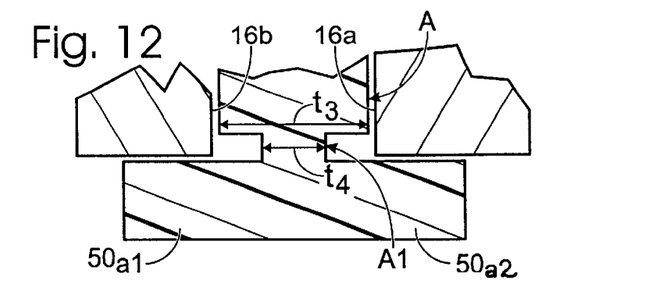
FIG. 12 is a magnified view of the centering portions of FIG. 10.

Turning to FIGS. 7A and 7B, it may also be preferable, particularly where bolts pass through the flanges, to include annular areas "A" of reduced thickness in the gasket 10. Centering portions are preferably provided in the outermost annular region of the regions "A," i.e., annular region "$A_1$." For example, FIG. 11 shows the gasket of FIG. 7B with two centering portions 50$a_1$ and 50$a_2$ according to FIG. 6A. FIG. 12 shows the area that is encircled in FIG. 11 enlarged for clarity. The annular region A has a thickness, or more generally a width, $t_3$ and is used as a sealing portion with sealing surfaces $A_{s1}$ and $A_{s2}$ that make contact with the flange faces. The annular region $A_1$ does not make contact with the flange faces because it has a thickness $t_4$ that is less than the thickness $t_3$, in the same manner that the centering portion 50$a$ has a width $w_{centering}$ that is less than the width $_{sealing}$ as described above in connection with FIG. 10. The annular region $A_1$ is attached to the region A at a radially outermost periphery 79 thereof, and extends radially outwardly of the region A. The annular region A supports at least one centering portion, here the portions 50$a_1$ and 50$a_2$. One of the portions 50$a_1$ extends away from one of the sealing surfaces $A_{s1}$ and the other portion 50$a_2$ extends away from the other of the sealing surfaces $A_{s2}$, so that, in this example, the two centering portions extend in opposite directions with respect to the sealing portion. The annular regions "A" are provided for reasons described in the '115 patent. Particularly, as taught in the '115 patent, it is desirable to minimize the area over which the gasket seal is made, for increasing the sealing pressure while at the same time decreasing the total force required therefor, and to place the gasket material as near as possible to points on the flanges at which tightening forces are applied, to decrease the tendency for the flanges to distort on account of the gasket's resistance to compression.

Figure 8:
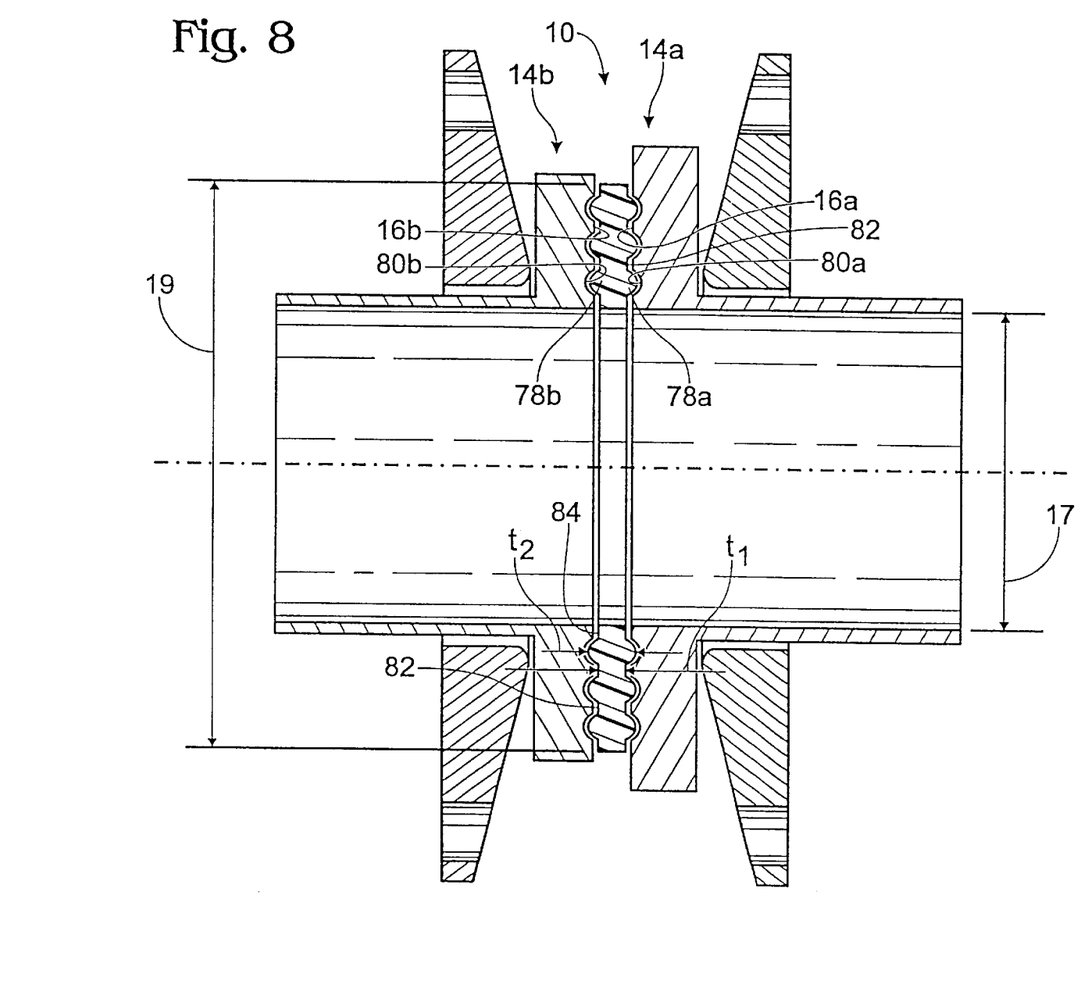
FIG. 8 is a cross-section of a pipe joint employing a fourth embodiment of a gasket having centering features according to the present invention.
Figure 9:
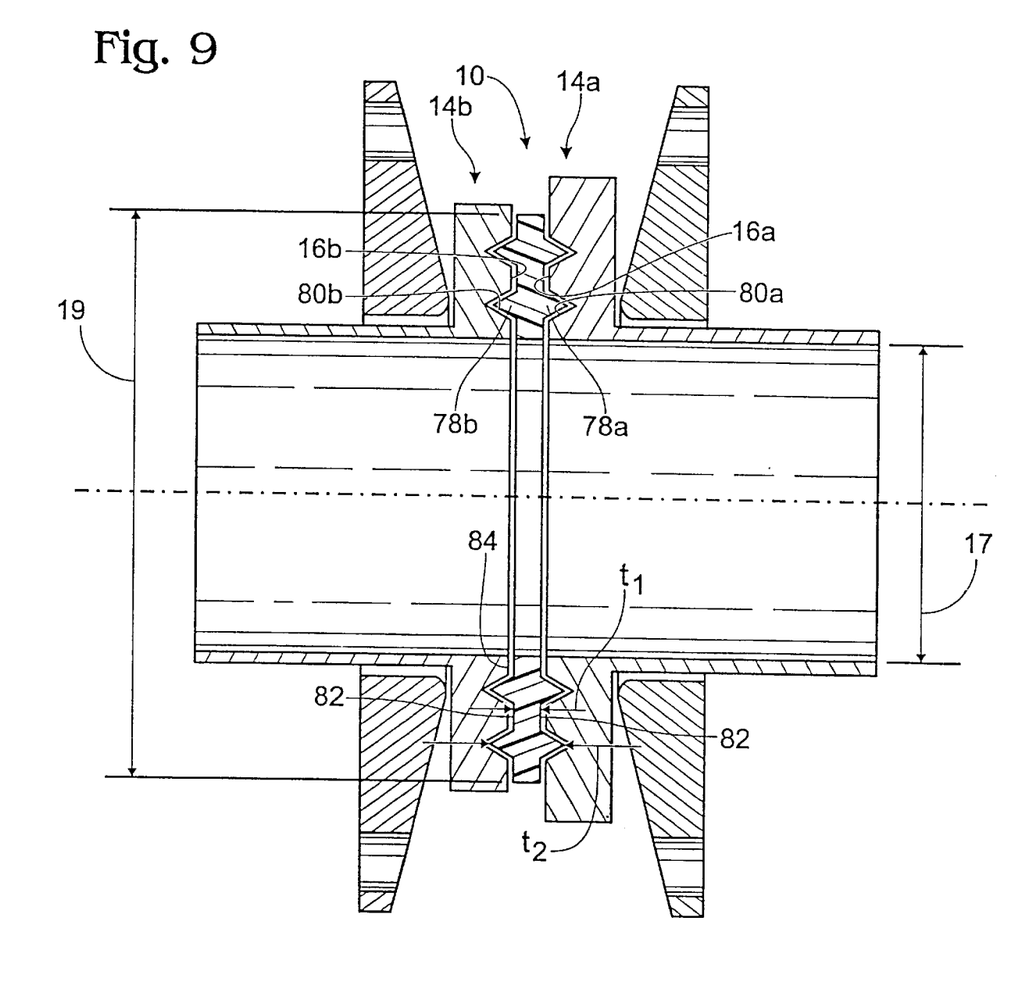
FIG. 9 is a cross-section of a pipe joint employing a fifth embodiment of a gasket having centering features according to the present invention.

Referring to FIGS. 8 and 9, additional embodiments of the gasket 10 having centering features are depicted. These embodiments are generally characterized by the employment, in registering the gasket 10 to the flanges 14$a$, 14$b$, of protuberances that are particularly shaped for mating with corresponding reliefs provided in the flange faces 16$a$, 16$b$ of the flanges. Significantly, the protuberances are not employed to make the gasket seal and, therefore, may be particularly adapted for centering purposes. For example, in some prior art gaskets, a relief is formed in corresponding pipe flanges for receiving all or a large portion of the gasket. When the pipe joint is tightened, the relief and the portion of the gasket in the vicinity thereof are pressed tightly together for the purpose of making the gasket seal. Where the gasket is relatively compliant, such portion must substantially deform in response to this force. This change in the dimensions of the portion upon application of tightening forces would prevent the portion from being effective for the purpose of accurately center the gasket.

In the embodiments of the invention shown in FIGS. 8 and 9, one or more annular, ring-like protuberances 78$a$, 78$b$ are provided along the flange faces 16$a$, 16$b$, between the outer diameter 19 and the inner diameter 17 of the gasket 10. The thickness of the gasket 10 changes from the base thickness "$t_1$" to the thickness "$t_2$" along a circumference lying between the inner diameter 17 and the outer diameter 19 of the gasket 10. The flange faces 16$a$, 16$b$ are appropriately relieved by corresponding reliefs 80$a$, 80$b$, having shapes that are complementary to the shapes of the protuberances 78$a$, 78$b$. For example, as in FIG. 8, the protuberances may have a semi-circular cross-section, with the flange faces including annular grooves having a slightly larger semi-circular cross-section. As in FIG. 9, the protuberances may have a triangular cross-section, with the flange faces including annular grooves having a triangular cross-section. The grooves and protuberances are preferably adapted to fit together so that they do not, on the one hand, substantially interfere when the flange faces 16$a$ and 16$b$ are brought tightly together against the gasket and, on the other, are not substantially loose. Either of these conditions detracts from the capability of the centering portions for centering the gasket. Accordingly, the seal is preferably made at least primarily at sealing portions 82 of the gasket that contact substantially planar surfaces of the flange faces 16$a$, 16$b$ rather than at the interface of the protuberances and the reliefs. It is also preferable that sealing portions 84 remain proximate the interface between the inner peripheral surfaces 20$a$ and 20$b$ of the pipe joint, to minimize flow restriction and trapping.

Particular shapes of protuberances 74$a$, 74$b$, 78$a$, 78$b$ having been shown, it will be readily apparent to those of ordinary skill that the protuberances may have any other cross-sectional or circumferential position-dependent shape wherein the thickness of the gasket changes from a base level of thicknesses "$t_1$" to an increased thickness "$t_2$". The protuberances may all have the same shapes or may have differing shapes, and the protuberances 74$a$, 74$b$ and 78$a$, 78$b$ may or may not be symmetrical with each other, all to provide for particular advantages. For example, it is preferable to employ pairs of protuberances mating with corresponding reliefs in both flange faces, to more positively align the entire pipe joint and to provide for interchangeable pipe sections 12$a$, 12$b$. However, either the protuberances having the reference designator "a" or the protuberances having the reference designator "b" in FIGS. 8 and 9 may be omitted to save the cost of forming a relief in one of the flanges. This may be particularly desirable, for example, when different sized pipe flanges are being coupled together to form the pipe joint 11, so that it is no longer an objective to provide for interchangability of the pipe sections.

It is to be recognized that, while a specific gasket having centering features has been shown as preferred, other configurations could be utilized, in addition to configurations already mentioned, without departing from the principles of the invention.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims that follow.

I claim:

1. A gasket, comprising a sealing portion having two opposing, substantially flat sealing surfaces for placement between respective ends of two pipes so as to form a seal therebetween, and at least one centering portion disposed at a predetermined position in relation to said sealing portion and extending generally perpendicular to said sealing surfaces so as to engage the pipe ends when said gasket is placed therebetween and thereby align the gasket and the pipe ends along a common central axis, the width of the centering portion being substantially less than the width of the sealing portion at the location where the centering portion joins the sealing portion, to facilitate removal of the centering portion from the gasket without corrupting the integrity of the sealing portion.

2. The gasket of claim 1, adapted so that said centering portion engages the pipe ends by abutment against an outer peripheral surface thereof.

3. The gasket of claim 2, wherein said at least one centering portion includes a first portion extending away from one of said sealing surfaces and a second portion extending away from the other of said sealing surfaces.

4. The gasket of claim 1, wherein the respective ends of said pipes include respective pipe flanges.

5. The gasket of claim 4, adapted so that said centering portion engages at least one of the pipe flanges by abutment against an outer peripheral surface thereof.

6. The gasket of claim 5, wherein said at least one centering portion includes a first portion extending away from one of said sealing surfaces and adapted to engage one of the pipe flanges by abutment against the outer peripheral surface thereof, and a second portion extending away from the other of said sealing surfaces and adapted to engage the other of the pipe flanges by abutment against the outer peripheral surface thereof.

7. The gasket of claim 4, wherein said at least one centering portion includes a first portion extending away from one of said sealing surfaces and a second portion extending away from the other of said sealing surfaces.

8. The gasket of claim 1, wherein said at least one centering portion includes a first portion extending outwardly from one of said sealing surfaces and a second portion extending outwardly from the other of said sealing surfaces.

9. A gasket, comprising a sealing portion having two opposing, substantially flat sealing surfaces for placement between respective ends of two pipes so as to form a seal therebetween, and a centering portion disposed at a predetermined position in relation to said sealing portion and extending generally perpendicular to said sealing surfaces so as to engage the pipe ends when the gasket is placed therebetween and thereby align the gasket and the pipe ends along a common central axis, wherein said centering portion is switchable to a flush configuration of the gasket.

10. The gasket of claim 9, adapted so that said centering portion engages at least one of the pipe ends by abutment against an outer peripheral surface thereof.

11. A gasket, comprising a sealing portion having two opposing, substantially flat sealing surfaces for placement between respective ends of two pipes so as to form a seal therebetween, and a centering portion disposed at a predetermined position in relation to said sealing portion and extending generally perpendicular to said sealing surfaces so as to engage the pipe ends when the gasket is placed therebetween and thereby align the gasket and the pipe ends along a common central axis, wherein the respective ends of said pipes include respective pipe flanges, wherein said centering portion is switchable to a flush configuration of the gasket.

12. The gasket of claim 11, adapted so that said centering portion engages at least one of the pipe flanges by abutment against an outer peripheral surface thereof.

13. A gasket, comprising a sealing portion having two opposing sides for placement between respective ends of two pipes, and a centering portion disposed at a predetermined position in relation to said sealing portion and extending in a direction generally perpendicular to at least one of said sides so as to engage at least one of the pipe ends when the gasket is placed therebetween and thereby align the gasket and the pipe ends along a common central axis, said centering portion being formed integrally with the gasket, the width of the centering portion being substantially less than the width of the sealing portion at the location where the centering portion joins the sealing portion, to facilitate removal of the centering portion from the gasket without corrupting the integrity of the sealing portion.

14. The gasket of claim 13, wherein said centering portion engages said one of the pipe ends by abutment against an outer peripheral surface thereof.

15. The gasket of claim 14, wherein said at least one centering portion includes a first portion extending away from one of said sealing surfaces and a second portion extending away from the other of said sealing surfaces.

16. The gasket of claim 13, wherein said centering portion includes a first portion extending away from one of said sides, and a second portion extending away from the other of said sides.

17. The gasket of claim 13, wherein the respective ends of said pipes include respective pipe flanges.

18. The gasket of claim 17, adapted so that said centering portion engages said at least one of the pipe flanges by abutment against an outer peripheral surface thereof.

19. The gasket of claim 18, wherein said at least one centering portion includes a first portion extending away from one of said sealing surfaces and adapted to engage one of the pipe flanges by abutment against the outer peripheral surface thereof, and a second portion extending away from the other of said sealing surfaces and adapted to engage the other of the pipe flanges by abutment against the outer peripheral surface thereof.

20. The gasket of claim 17, wherein said at least one centering portion includes a first portion extending away from one of said sealing surfaces, and a second portion extending away from the other of said sealing surfaces.

21. A gasket, comprising a radially extending, annular sealing portion having two opposing, substantially flat sealing surfaces defining a first width of the gasket for placement between respective ends of two pipes so as to form a seal, a second annular region of reduced width relative to said first width attached to said sealing portion at a radially outwardmost periphery thereof, said second annular region supporting at least one centering portion disposed at a predetermined position in relation to said sealing portion and extending generally perpendicular to said sealing surfaces so as to engage the pipe ends when said gasket is placed therebetween and thereby align the gasket and the pipe ends along a common central axis.

22. The gasket of claim 21, adapted so that said centering portion engages the pipe ends by abutment against an outer peripheral surface thereof.

23. The gasket of claim 22, wherein said at least one centering portion includes a first portion extending away from one of said sealing surfaces and a second portion extending away from the other of said sealing surfaces.

24. The gasket of claim 21, wherein the respective ends of said pipes include respective pipe flanges.

25. The gasket of claim 24, adapted so that said centering portion engages at least one of the pipe flanges by abutment against an outer peripheral surface thereof.

26. The gasket of claim 25, wherein said at least one centering portion includes a first portion extending away from one of said sealing surfaces and adapted to engage one of the pipe flanges by abutment against the outer peripheral surface thereof, and a second portion extending away from the other of said sealing surfaces and adapted to engage the other of the pipe flanges by abutment against the outer peripheral surface thereof.

27. The gasket of claim 24, wherein said at least one centering portion includes a first portion extending away from one of said sealing surfaces and a second portion extending away from the other of said sealing surfaces.

28. The gasket of claim 21, wherein said at least one centering portion includes a first portion extending away from one of said sealing surfaces and a second portion extending away from the other of said sealing surfaces.

* * * * *